United States Patent [19]

Werner et al.

[11] 4,113,308
[45] Sep. 12, 1978

[54] TILTABLE SEAT

[75] Inventors: Paul Werner; Egon Wirtz; Gerhard Lehmann, all of Remscheid, Fed. Rep. of Germany

[73] Assignee: Keiper K. G., Remscheid-Hasten, Fed. Rep. of Germany

[21] Appl. No.: 786,815

[22] Filed: Apr. 12, 1977

Related U.S. Application Data

[63] Continuation of Ser. No. 616,410, Sep. 24, 1975, abandoned.

[30] Foreign Application Priority Data

Sep. 24, 1974 [DE] Fed. Rep. of Germany ....... 2446181

[51] Int. Cl.$^2$ .................... A47C 1/025; B60N 1/06
[52] U.S. Cl. .................... 297/362; 297/367; 297/379
[58] Field of Search ............... 297/355, 362, 366–372, 297/378, 379; 16/139, 144, 146, 147

[56] References Cited

U.S. PATENT DOCUMENTS

| 3,299,466 | 1/1967 | Werner | 297/366 X |
| 3,432,881 | 3/1969 | Putsch et al. | 297/366 X |
| 3,479,088 | 11/1969 | Bonnaud | 297/362 X |
| 3,866,270 | 2/1975 | Suzuki et al. | 297/379 X |
| 3,887,232 | 6/1975 | Dinkle | 297/367 |
| 3,901,100 | 8/1975 | Iida et al. | 297/379 X |
| 3,966,253 | 6/1976 | Berghof et al. | 297/367 |

FOREIGN PATENT DOCUMENTS 1,555,857 7/1970 Fed. Rep. of Germany ........... 297/379
2,108,624 8/1972 Fed. Rep. of Germany ........... 297/366

Primary Examiner—Roy D. Frazier
Assistant Examiner—William E. Lyddane
Attorney, Agent, or Firm—Michael J. Striker

[57] ABSTRACT

A seat has a seat element and a back element which is to be tiltable forwardly and rearwardly relative to the seat element. Two hinges are provided at the opposite sides of the seat and each includes a first hinge member on the seat element and a cooperating second hinge member on the back element. Each hinge has an arrangement which connects the first and second hinge members thereof for relative pivoting and which includes a first gear turnable with one of the hinge members and a second gear turnable with the other hinge member, the two gears having cooperating annuli of gear teeth which mesh with one another. One of the gears can be disengaged from its associated hinge member so that the latter can turn freely relative to this gear. The arrangement for this purpose includes a first abutment system which normally connects the gear to the associated hinge member, and a second abutment system which also normally connects the gear to the associated hinge member. One operating arrangement permits the first abutment system to be disengaged so as to permit the associated hinge member and hence the back element to pivot forwardly and another operating device permits the second abutment system to be disengaged to permit rearward tilting of the back element.

8 Claims, 3 Drawing Figures

TILTABLE SEAT

This is a continuation of application Ser. No. 616,410, filed Sept. 24, 1975, now abandoned.

BACKGROUND OF THE INVENTION

The present invention relates to a seat in general, and in particular to a seat in which the back element can be tilted or pivoted relative to the seat element. The invention is especially suitable for use in vehicle seats, such as the seats of automotive vehicles, but is generally applicable in other types of seats as well in which it is desired to be able to pivot the back element relative to the seat element.

Arrangements for permitting the back element to be pivoted relative to the seat element are already known in the prior art. They comprise two hinges located at opposite lateral sides of the seat and each connecting the back element to the seat element. They include a device which can be operated to permit the hinges—which are normally blocked against relative pivotal movement—to pivot so as to tilt the back element relative to the seat element.

The difficulty with the prior art is that the prior-art arrangements are not very safe in use. That is to say that they do not preclude the possibility of careless or even unintentional operation, for example during the movement of a motor vehicle provided with the seat, permitting the back element of the seat to tilt downwardly very quickly and surprisingly, and thereby startling the person on the seat and withdrawing back support for this person. If this occurs to the vehicle operator the result is likely to be an accident.

On the other hand, it is of course desired that the seat construction be such as to permit rapid tilting of the back element to a desired position, so that only fine adjustments need be made with the actual adjusting mechanism. Moreover, the back element must also be freely pivotable in forward direction upon operation of a release arrangement, at least if the seat is for example used in a two-door motor vehicle where ingress to and egress from the rear seat of the vehicle is possible only by tilting the back element of the front seat forwardly.

SUMMARY OF THE INVENTION

It is a general object of the present invention to overcome the disadvantages of the prior art.

More particularly, it is an object of this invention to provide an improved vehicle seat construction wherein the arrangements mounting the back element on the seat element of the seat are of such character as to assure optimum safety against unintentional or careless operation which would suddenly deprive a person using the seat of the necessary back support.

More particularly, it is an object of the invention to provide such a construction wherein the tilting of the back element in the rearward direction beyond a safe and permissible angle of inclination relative to the seat element cannot be triggered either unintentionally or carelessly.

An additional object of the invention is to provide such an arrangement wherein the rapid forward tilting of the back element relative to the seat element is not in any way made difficult by the safety arrangements which guard against undesirable rearward tilting.

In keeping with these objects, and with others which will become apparent hereafter, one feature of the invention resides, in a seat, particularly in a vehicle seat, having a seat element and a back element, in a combination which comprises two hinges at opposite sides of the seat and each including a first hinge member on the seat element and a cooperating second hinge member on the back element. Connecting means are provided for each of these hinges and connect the first and second hinge members of the respective hinges for relative pivoting. This connecting means comprises a first gear turnable with one of the hinge members of the respective hinge and having an internal annulus of teeth, and a second gear turnable with the other of the hinge members and having an external annulus of teeth received within and meshing with teeth of the first annulus. Disengaging means are provided for disengaging one of the gears from the associated hinge member to permit free tilting of the back element in forward and rearward direction. This disengaging means comprises first abutment means normally connecting the one gear to the associated hinge member for turning therewith, first operating means for disengaging the first abutment means from the one gear of both of the hinges, second abutment means normally also connecting the one gear to the associated hinge member for turning therewith, and a pair of second operating means each associated with the second abutment means of one of the hinges and requiring joint operation to disengage both of the second abutment means.

Thus, a simple operation of the single first operating means suffices to release the back element for tilting in forward direction, but in order to enable tilting of the back element in rearward direction two second operating means must be jointly operated, and since these second operating means are located at the opposite sides of the seat, this necessitates the use of both hands of a person on the seat. Evidently, this precludes both unintentional and careless operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a section taken on line III—III of FIG. 2, through the two hinges associated with the seat and located at the opposite sides thereof.

DESCRIPTION OF THE PREFERRED EMBODIMENTS

Figure 1:
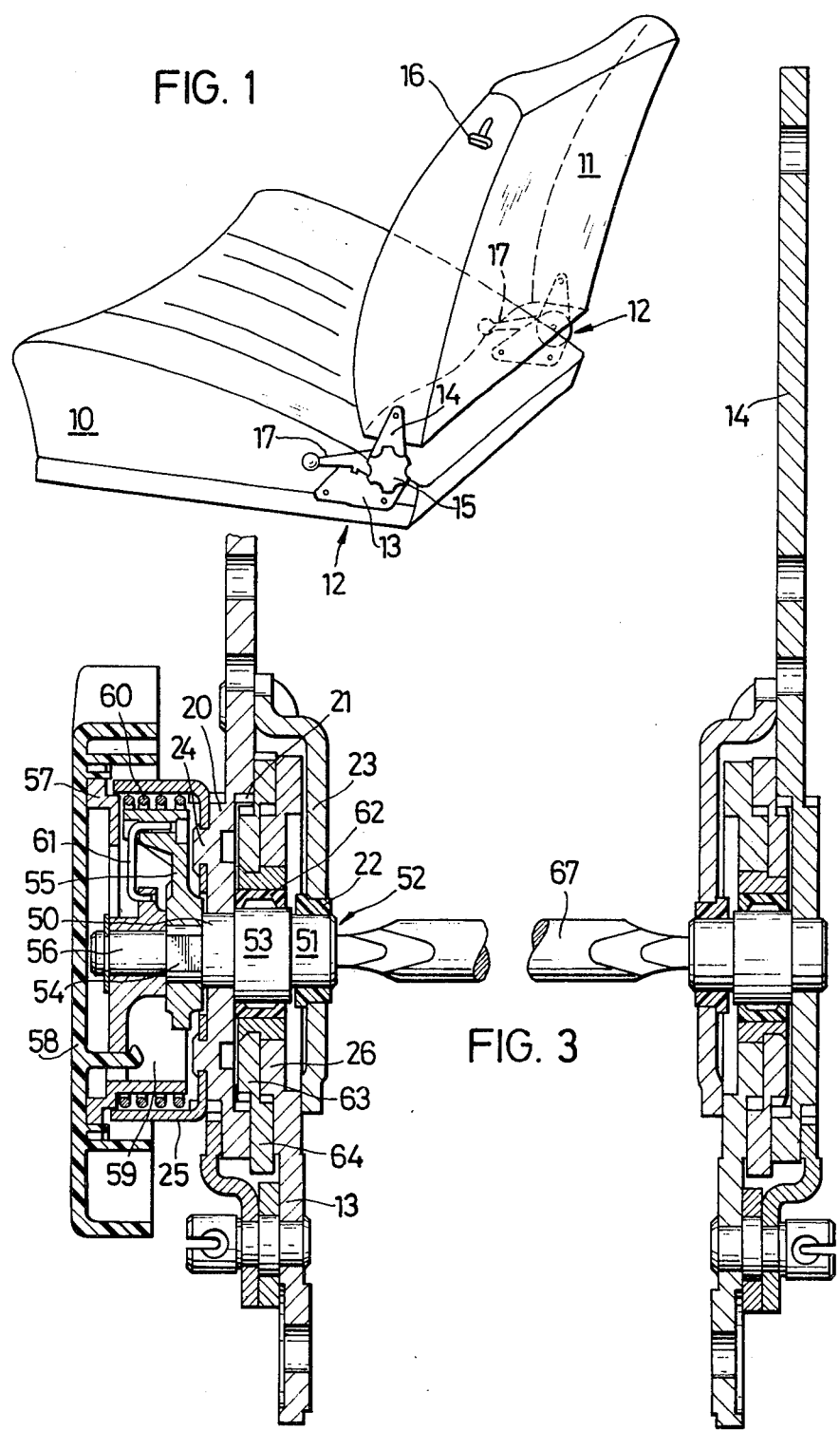
FIG. 1 is a perspective view illustrating a seat according to the present invention.

FIG. 1 shows a seat provided with the present invention. This may be the seat of a motor vehicle or it could be a different kind of seat. It has a seat element 10 and a back element 11. At the opposite sides of the seat the elements 10 and 11 are connected to one another by respective hinges 12. Each of these hinges 12 includes a first hinge member 13 which is mounted on the seat element 10 and a second hinge member 14 which is mounted on the back element 14.

The cooperating hinge members 13 and 14 of each hinge 12 can be fine-adjusted relative to one another. For this purpose a handle 15 is provided which is associated with one of the hinges 12 and which, when operated (e.g. when turned) operates the fine-adjusting arrangement of the hinge 12 with which it is associated and, via a coupling shaft 67 (FIG. 3), operates the same arrangement of the other hinge 12 at the other side of the seat. In addition, an operating handle 16 is provided on the back element 11 which acts upon the blocking arrangements of both of the hinges 12 simultaneously, for example via a Bowden Cable linkage or the like. Such an arrangement is well known in the art and serves to permit a free forward tilting of the back element 11 relative to the seat element 10, for example to permit access to the rear seat of a two-door automobile in which the seat may be installed. In addition, each of the hinges 12 is provided with a handle or operating means 17; both of these must be operated simultaneously in order to free the back element 11 for rearward pivoting, and this simultaneous operation is possible only if the person on the seat utilizes both hands, thus excluding the disadvantageous possibilities mentioned earlier.

Figure 2:
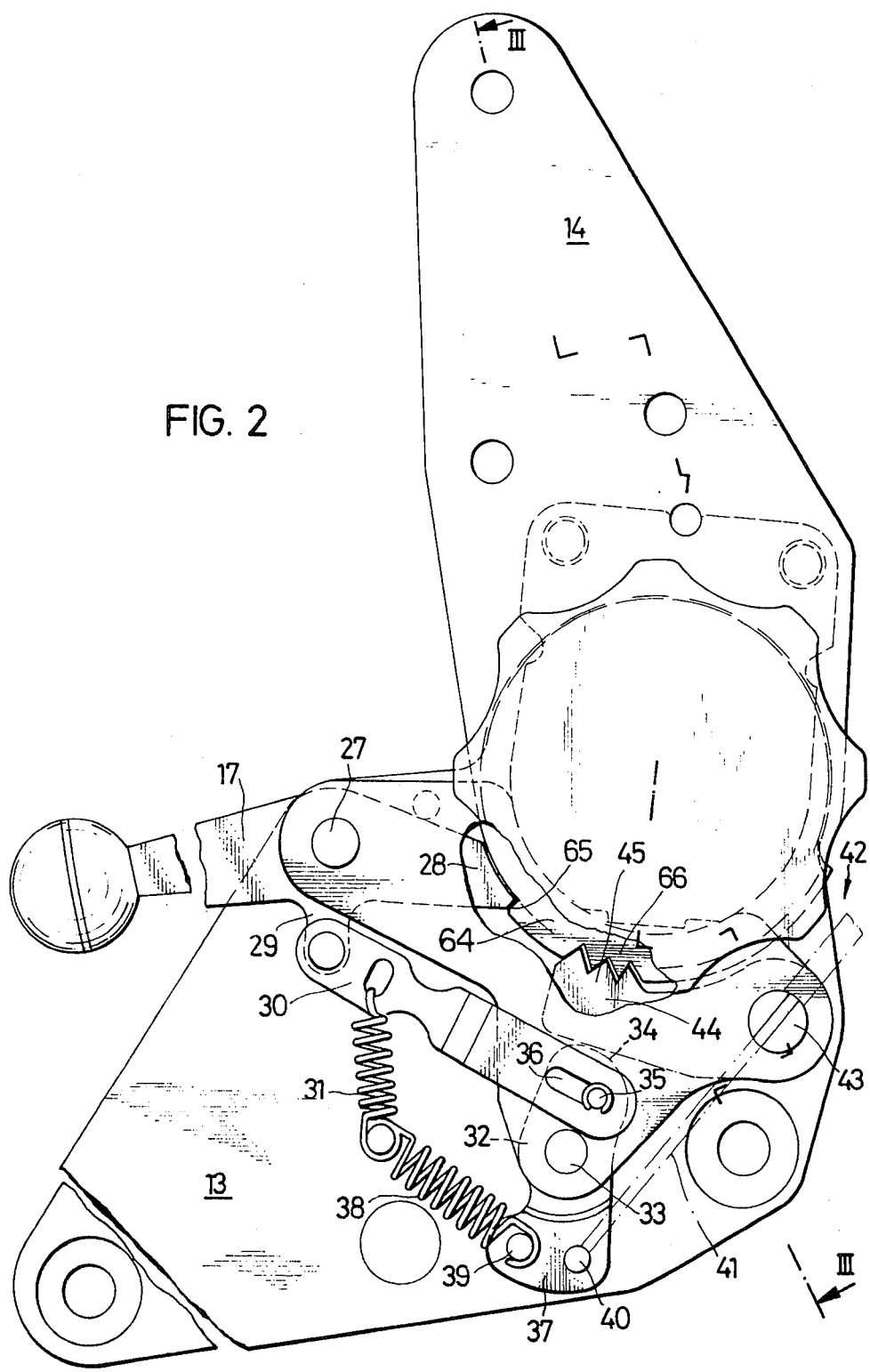
FIG. 2 is an enlarged-scale detail view, partly broken away, showing one of the hinge arrangements and associated components of the seat in FIG. 1, of the starting position.

FIGS. 2 and 3 show that each of the hinge members 14 has a circular part 20 which is formed to the configuration of a hollow gear 21 having an internal gear tooth annulus. A journalling bore is formed in the part 20 concentrically with this annulus and a similar journalling bore in a support member 23 which is connected with the hinge member 14, is in registry with the journalling bore of the part 20 and provided with a bearing sleeve 22. A brake drum 25 is connected with the part 20 by rivetting, for example by deforming portions of projecting pins 24.

The hinge member 13 of each hinge 12 has an end portion formed to circular configuration and identified with reference numeral 26; this portion 26 extends turnably and shiftably behind the support member 23. The handle 17 is pivotably mounted on the respective hinge member 13 by means of a pin 27 and is provided with a blocking or detent nose 28. It also has an arm 29 which guides a coupling member 30 that is engaged by a tensioned helical spring 31 which urges the handle 17 to its normal position, i.e. to its blocking position.

A supporting member 32 is pivotally mounted on the respective hinge member 13 by means of a pin 33 and carries on an arm which is delimited by a surface 34 a further pin 35 engaging in an elongated slot 36 of the coupling member 30. A further arm 37 of the member 32 carries a pin 39 which engages a tensioned helical spring 38, and there is further provided on this same arm a pin 40 serving to engage a lengthwise shiftable interior member 41 of a Bowden Cable linkage 42, the outer jacket of which is supported at the free end portion of a pin 4 that is threaded to the hinge member 13.

A blocking pawl 44 is pivotably journalled on the pin 43 and is provided with a row of teeth 45. In the starting position shown in FIG. 2 the member 32 engages the blocking pawl 44 with its surface 34 and maintains the blocking pawl 44 in blocking or engaging position. By operation of the Bowden Cable linkage 41, 42 the member 32 can be pivoted in counterclockwise direction against the biasing action of the spring 38, thereby releasing the blocking pawl 44 for pivoting in counterclockwise direction to a release position. During this pivoting movement the pin 35 of the member 32 shifts lengthwise in the slot 36 of the coupling member 30, so that the handle 17 is not influenced during the pivoting.

If, however, the handle 17 itself is pivoted in clockwise direction, then the nose 28 becomes disengaged and the member 32 is displaced by the coupling member 30 until the blocking pawl 44 is released. Thus, displacement of the member 17 automatically acts upon both of the retaining or blocking devices which are mounted on the respective hinge member 13.

The journalling bore of the part 20 and the bearing sleeve 22 accommodate two portions 50 and 51 of a shaft 52, which have a common axis of rotation. They are turnable and have located between them a portion 53 of the shaft 52 which is eccentric with reference to this axis of rotation. The shaft 52 is further provided with a portion 54 that has a flat facet and on which a follower 55 is non-rotatably mounted so that it can only turn with but not relative to the shaft 52. A pin 56 of the shaft 52 extends past the portion 54 and carries a control member 57 which is freely turnable but cannot be axially moved at least not unintentionally. A handle 58 is connected to the control member 57 for joint rotation. An interrupted circumferential wall 59 of the member 57 cooperates with the follower 55 via the inwardly bent ends of a coil spring 60 which is stressed to normally engage the inner circumferential surface of the brake drum 25, so that the wall 59 transmits rotational movement to the follower 55 and hence to the shaft 52, under prior release of the braking action exerted by the spring 60. A prestressed spring 61 is interposed between and connected to the members 57 and 55.

A gear 63 is freely turnably mounted via a sleeve 62 on the eccentric part 53 of the shaft 52; in accordance with the degree of eccentric displacement of the part 53, the gear rolls with its own teeth along the inner teeth of the annulus formed in the hollow gear 21. There is a difference in the number of teeth of the gear 21 and the gear 63, and in accordance with this difference there is a precise relative displacement of the gears 21 and 63 that takes place when the shaft 52 is turned. The gear 63 is formed by pressing or otherwise shaping an annular externally toothed portion on an approximately circular disk; an annular margin 64 circumferentially surrounds the portion 26 with freedom of relative rotation and has a circumferential face which is provided with an abutment face 65 that cooperates with the nose 28 of the handle 17 to constitute an abutment means therewith, and a row of teeth 66 which are offset circumferentially relative to the abutment face 65 and which corresponds to the row of teeth 45 formed on the pawl 44 and constitutes an engaging means therewith. The shafts 52 of the two hinges 12 at the opposite sides of the seat are coupled by the shaft 67 so that they rotate in unison when the member 57 is turned.

A free forward pivoting of the back element 11 requires only the retraction of the pawl 44 in the two hinges 12, for which purpose it is merely necessary to operate the handle 16. The noses 28 remain ineffective because the abutment faces 65 move out of engagement with them.

On the other hand, a free backward or rearward tilting of the back element 11 with the hinge member 14 mounted thereon, requires a movement of the two handles 17 to a release position. This requires a user to employ both hands.

When the respective handle 17 is pivoted the associated nose 28 disengages the cooperating surface 65 and unblocks the arrangement at the respective hinge 12. Furthermore, in each hinge 12 the member 32 is pivoted in counterclockwise direction via the coupling member 30, so that the blocking pawl 44 also can move to an unblocking position, releasing the back element 11 for free pivoting in rearward direction. If, following the rearward pivoting of the back element 11 and return of the pivot 44 toward the blocking position into less than full engagement with the teeth 66, to the back element 11 then pivots slightly forwardly again, the blocking devices both automatically fully engage again and arrest the back element 11 in a position which is generally determined by the degree to which it was tilted rearwardly and which is specifically—in its fine adjustment—determined by the setting of the fine adjustment devices operated by the handle 58.

It is advantageous if the degree to which the back element 11 can be pivoted rearwardly out of the vertical position purely by operation of the fine adjustment devices operated by the handle 58, is limited to approximately 30° because this is still safe in terms both of providing adequate support to the back of a person on the seat and also of preventing such a person from sliding forwardly on the seat, which would be particularly disadvantageous if such person were intended to be held by a seat belt that is extended across the person's lap.

A simultaneous operation of both of the handles 17 could also be utilized to trigger electrical or electronic devices which switch off or prevent starting of the vehicle engine, thus assuring that unless the back element 11 is in a sufficiently upright position the engine cannot operate and the vehicle cannot be driven.

It will be understood that various modifications may be made in the illustrated embodiment, without thereby departing from the scope and intent of the invention. For example, in place of a rigid coupling element 30 provided at one end with a slot 36, a flexible coupling element could be utilized which can transmit only pull but no push.

It is evident that each of the hinges 12 is provided with two types of blocking arrangements, i.e. the respective components 65 and 66. It is advantageous if one of these prevents pivoting of the back element 11 both in forward and in rearward direction, whereas the other prevents pivoting only in the rearward direction. This provides optimum safety, because in order to be able to pivot the back element in rearward direction both of the components 65, 66 must be disengaged and both of them are independent of one another.

It will be understood that each of the elements described above, or two or more together, may also find a useful application in other types of constructions differing from the types described above.

While the invention has been illustrated and described as embodied in a seat construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a seat, particularly in a vehicle seat, a combination comprising a seat element; a back element; means for mounting said back element on said seat element for tilting from a selected erect position in a frontward and a rearward range; two blocking arrangements interposed between said elements and each including engaging means normally so blocking said back element in said selected erect position as to prevent the same from tilting in both of said ranges, and abutment means normally so blocking said back element in said selected erect position as to prevent the same only from tilting in said rearward range; and means for releasing said back element for selective tilting, including shared first disengaging means for disengaging only said engaging means of both of said blocking arrangements to thereby release said back element for tilting only in said frontward range, and two mutually separate second disengaging means each for jointly disengaging both said engaging and said abutment means of only one of said blocking arrangements so as to require the actuation of both of said separate second disengaging means when it is desired to release said back element for tilting in said rearward range.

2. A combination as defined in claim 1, wherein said mounting means includes two hinges each at one side of the seat and each including two hinge members respectively rigid with said elements; and wherein said engaging and abutment means includes first engaging and abutment portions on one of said hinge members of each of said hinges, and cooperating second engaging and abutment portions on the other hinge member of each of said hinges.

3. In a seat, particularly in a vehicle seat, a combination comprising a seat element; a back element; means for mounting said back element on said seat element for tilting from a selected erect position in a frontward and a rearward range, including two hinges each at one side of the seat and each including two hinge members respectively rigid with said elements; two blocking arrangements each including an engaging pawl having first engaging portions on one, and cooperating second engaging portions on the other, of said hinge members of each of said hinges and normally so blocking said back element in said selected erect position as to prevent the same from tilting in both of said ranges, and an abutment pawl having first abutment portions on one, and cooperating second abutment portions on the other, of said hinge members of each of said hinges and normally so blocking said back element in said selected erect position as to prevent the same only from tilting in said rearward range; and means for releasing said back element for selective tilting, including shared first disengaging means for disengaging only said engaging pawls of both of said blocking arrangements to thereby release said back element for tilting only in said frontward range, and two mutually separate second disengaging means each for jointly disengaging both said engaging and said abutment pawl of only one of said blocking arrangements so as to require the actuation of both of said separate second disengaging means when it is desired to release said back element for tilting in said rearward range, including a coupling element connecting said pawls and causing disengagement of said engaging pawl in response to the actuation of said abutment pawl.

4. A combination as defined in claim 3, wherein said engaging pawl includes a supporting element springbiased towards engagement of said first engaging portion with said second engaging portion of said engaging means; wherein said first abutment portion is a nose of said abutment pawl; and wherein said second disengaging means includes an actuating portion integral with said abutment pawl.

5. A combination as defined in claim 3, wherein said coupling element fixedly engages said abutment pawl and so engages said engaging pawl as to cause the same to become disengaged only when said coupling element moves in one of two opposite directions.

6. A combination as defined in claim 5, wherein said coupling element is a link having one end portion pivotably connected to said abutment pawl and another end portion pivotably and longitudinally shiftably connected to said engaging pawl.

7. In a seat, particularly in a vehicle seat, a combination comprising a seat element; a back element; means for mounting said back element on said seat element for tilting from a selected erect position in a frontward and a rearward range, including two hinges each at one side of the seat and each including two hinge members respectively rigid with said elements; two blocking arrangements each including engaging segments of teeth on the respective hinge members of each of said hinges which normally so block said back element in said selected erect position as to prevent the same from tilting in both of said ranges, and abutment shoulders on the respective hinge members of each of said hinges which normally so block said back element in said selected erect position as to prevent the same only from tilting in said rearward range; and means for releasing said back element for selective tilting, including shared first disengaging means for disengaging only said engaging segments of teeth of both of said blocking arrangements to thereby release said back element for tilting only in said frontward range, and two mutually separate second disengaging means each for jointly disengaging both said engaging segments of teeth and said abutment shoulders of only one of said blocking arrangements so as to require the actuation of both of said separate second disengaging means when it is desired to release said back element for tilting in said rearward range.

8. In a seat, particularly in a vehicle seat, a combination comprising a seat element; a back element; means for mounting said back element on said seat element for tilting from a selected erect position in a frontward and a rearward range including two hinges each at one side of the seat and each including two hinge members respectively rigid with said elements and a pair of interengaging gears incorporated in one of said hinge members of each of said hinges, which assume a predetermined position relative to one another in said selected erect position of said back element and maintain the same during the tilting of said back element in said ranges; two blocking arrangements interposed between said elements and each including engaging means normally so blocking said back element in said selected erect position as to prevent the same from tilting in both of said ranges, and abutment means normally so blocking said back element in said selected erect position as to prevent the same only from tilting in said rearward range, including first engaging and abutment portions on the other of said hinge members of each of said hinges, and cooperating second engaging and abutment portions on one of said gears of said one hinge member of each of said hinges; and means for releasing said back element for selective tilting, including shared first disengaging means for disengaging only said engaging means of both of said blocking arrangements to thereby release said back element for tilting only in said frontward range, and two mutually separate second disengaging means each for jointly disengaging both said engaging and said abutment means of only one of said blocking arrangements so as to require the actuation of both of said separate second disengaging means when it is desired to release said back element for tilting in said rearward range.

* * * * *